(12) United States Patent
Alpert et al.

(10) Patent No.: US 11,881,036 B2
(45) Date of Patent: Jan. 23, 2024

(54) DEVICES AND METHODS FOR DETECTING DROWSINESS OF DRIVERS OF VEHICLES

(71) Applicant: Nauto, Inc., Palo Alto, CA (US)

(72) Inventors: Benjamin Oren Alpert, Sunnyvale, CA (US); Jacek Jakub Konieczny, Poznan (PL); Shukui Zhang, Redwood City, CA (US); Tahmida Binte Mahmud, San Jose, CA (US)

(73) Assignee: Nauto, Inc., Palo Alto, CA (US)

( * ) Notice: Subject to any disclaimer, the term of this patent is extended or adjusted under 35 U.S.C. 154(b) by 113 days.

(21) Appl. No.: 17/140,039

(22) Filed: Jan. 1, 2021

(65) Prior Publication Data
US 2022/0215200 A1 Jul. 7, 2022

(51) Int. Cl.
*G06K 9/00* (2022.01)
*G06N 3/02* (2006.01)
*G06V 20/59* (2022.01)
*G06V 40/18* (2022.01)

(52) U.S. Cl.
CPC ............. *G06V 20/597* (2022.01); *G06N 3/02* (2013.01); *G06V 40/193* (2022.01)

(58) Field of Classification Search
CPC ....... G06V 20/597; G06V 40/193; G06N 3/02
See application file for complete search history.

(56) References Cited

FOREIGN PATENT DOCUMENTS

WO   WO 2020/219054   * 10/2020   ............... G06K 9/62

* cited by examiner

*Primary Examiner* — David F Dunphy
(74) *Attorney, Agent, or Firm* — Vista IP Law Group, LLP (57) ABSTRACT

An apparatus includes: a camera configured to view a driver of a vehicle; and a processing unit comprising a first model and a second model; wherein the first model is configured to process the images of the driver and to output feature information based on the images, and wherein the second model is configured to receive the feature information from the first model, and to generate an output that indicates whether the driver is drowsy or not.

24 Claims, 7 Drawing Sheets

DEVICES AND METHODS FOR DETECTING DROWSINESS OF DRIVERS OF VEHICLES

FIELD

The field relates to vehicle cameras, and more particularly, to vehicle cameras configured to monitor drivers of vehicles.

BACKGROUND

Cameras have been used in vehicles to capture images of drivers of the vehicles. For example, cameras have been installed in vehicles for monitoring drivers of vehicles to determine whether the drivers are distracted or not. In some cases, when monitoring drivers of vehicles, it may be desirable to identify the eyes of the driver in the camera images, and to determine a gazing direction of the eyes of the driver. The determined gazing direction may be used to determine whether the driver is keeping his/her eyes on the road or not.

Unlike detecting distraction of drivers, detecting drowsiness is more difficult and challenging. This is because while distraction of a driver may be identified based on a single image that captures a pose of the driver, drowsiness of the driver may not be identifiable based only on a single image. Although it is envisioned that multiple images capturing a drowsiness behavior of the driver may be analyzed to detect the drowsiness, analyzing a batch of images in a sequence over a duration would require significant processing power and computational resources, and may not detect drowsiness fast enough to provide real-time monitoring of the driver.

Techniques for determining whether a driver is drowsy or not are described herein.

SUMMARY

An apparatus includes: a camera configured to view a driver of a vehicle; and a processing unit comprising a first model and a second model; wherein the first model is configured to process the images of the driver and to output feature information based on the images, and wherein the second model is configured to receive the feature information from the first model, and to generate an output that indicates whether the driver is drowsy or not.

Optionally, the first model comprises a first neural network model configured to process the images.

Optionally, the first neural network model is configured to identify one or more poses of the driver.

Optionally, the second model comprises a second neural network model that is coupled in series with respect to the first neural network model.

Optionally, the first neural network model is configured to identify poses of the driver over a duration, and output the feature information in a time series that indicates the identified poses of the driver over the duration; and wherein the second neural network model is configured to process the time series to determine whether the driver is drowsy or not.

Optionally, the second neural network model is configured to receive the feature information in a time series.

Optionally, the feature information includes information regarding eye closure of the driver.

Optionally, the second model is configured to determine whether the driver is drowsy or not based on a blink rate, a percentage-of-eyes-closed metric, a duration of eyes closed, time took to achieve eyelid closure, poses of the driver, or any combination of the foregoing.

Optionally, the second model is configured to determine whether the driver is drowsy or not based on the feature information from the first model, and also based on information regarding a driving participation by the driver.

Optionally, the camera has a frame rate that is at least 10 frames per second.

Optionally, the feature information cover features of the driver that occur over a duration that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, or 40 minutes.

A method performed by an apparatus having a camera and a processing unit, the processing unit having a first model and a second model, includes: generating, by the camera, images of a driver of a vehicle; processing the images by the first model of the processing unit to obtain feature information; providing, by the first model, the feature information; obtaining, by the second model, the feature information from the first model; and processing, by the second model, the feature information to obtain an output that indicates whether the driver is drowsy or not.

Optionally, the first model comprises a first neural network model.

Optionally, the images are processed by the first neural network model to identify one or more poses of the driver.

Optionally, the second model comprises a second neural network model that is coupled in series with respect to the first neural network model.

Optionally, the images are processed by the first neural network model to identify poses of the driver over a duration, and wherein the feature information is in a time series and indicates the identified poses of the driver over the duration; and wherein the act of processing the feature information comprises processing the time series to determine whether the driver is drowsy or not.

Optionally, the feature information is in a time series.

Optionally, the feature information includes information regarding eye closure of the driver.

Optionally, the feature information is processed by the second model to determine whether the driver is drowsy or not based on a blink rate, a percentage-of-eyes-closed metric, a duration of eyes closed, time took to achieve eyelid closure, poses of the driver, or any combination of the foregoing.

Optionally, the method further includes obtaining information regarding a driving participation by the driver, wherein the output that indicates whether the driver is drowsy or not is also based on the information regarding the driving participation by the driver.

Optionally, the camera has a frame rate that is at least 10 frames per second.

Optionally, the feature information cover features of the driver that occur over a duration that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, or 40 minutes.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

DESCRIPTION OF THE EMBODIMENTS

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Figure 1:
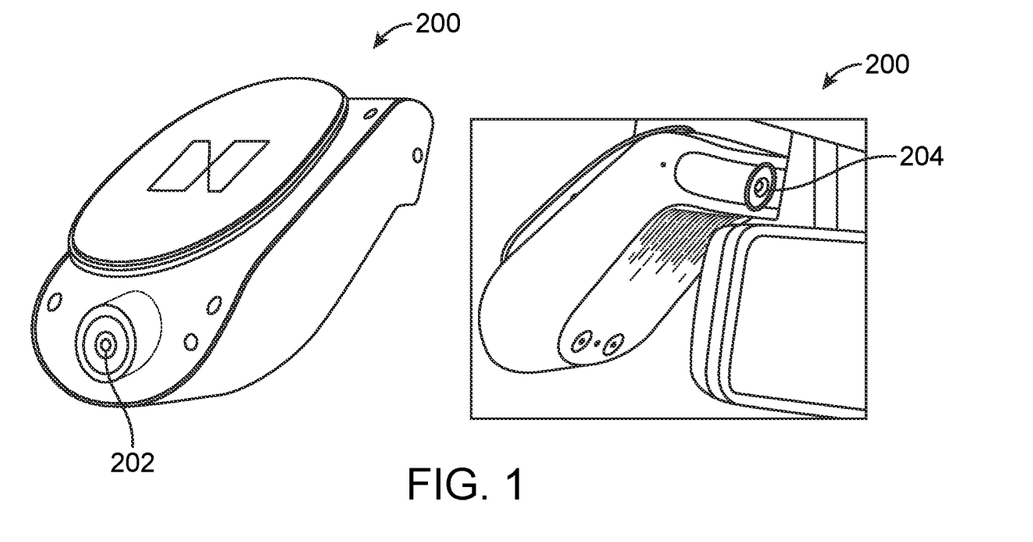
FIG. 1 illustrates an apparatus in accordance with some embodiments.

FIG. 1 illustrates an apparatus 200 in accordance with some embodiments. The apparatus 200 is configured to be mounted to a vehicle, such as to a windshield of the vehicle, to the rear mirror of the vehicle, etc. The apparatus 200 includes a first camera 202 configured to view outside the vehicle, and a second camera 204 configured to view inside a cabin of the vehicle. In the illustrated embodiments, the apparatus 200 is in a form of an after-market device that can be installed in a vehicle (i.e., offline from the manufacturing process of the vehicle). The apparatus 200 may include a connector configured to couple the apparatus 200 to the vehicle. By means of non-limiting examples, the connector may be a suction cup, an adhesive, a clamp, one or more screws, etc. The connector may be configured to detachably secure the apparatus 200 to the vehicle, in which case, the apparatus 200 may be selectively removed from and/or coupled to the vehicle as desired. Alternatively, the connector may be configured to permanently secure the apparatus 200 to the vehicle. In other embodiments, the apparatus 200 may be a component of the vehicle that is installed during a manufacturing process of the vehicle. It should be noted that the apparatus 200 is not limited to having the configuration shown in the example, and that the apparatus 200 may have other configurations in other embodiments. For example, in other embodiments, the apparatus 200 may have a different form factor. In other embodiments, the apparatus 200 may be an end-user device, such as a mobile phone, a tablet, etc., that has one or more cameras.

Figure 2:
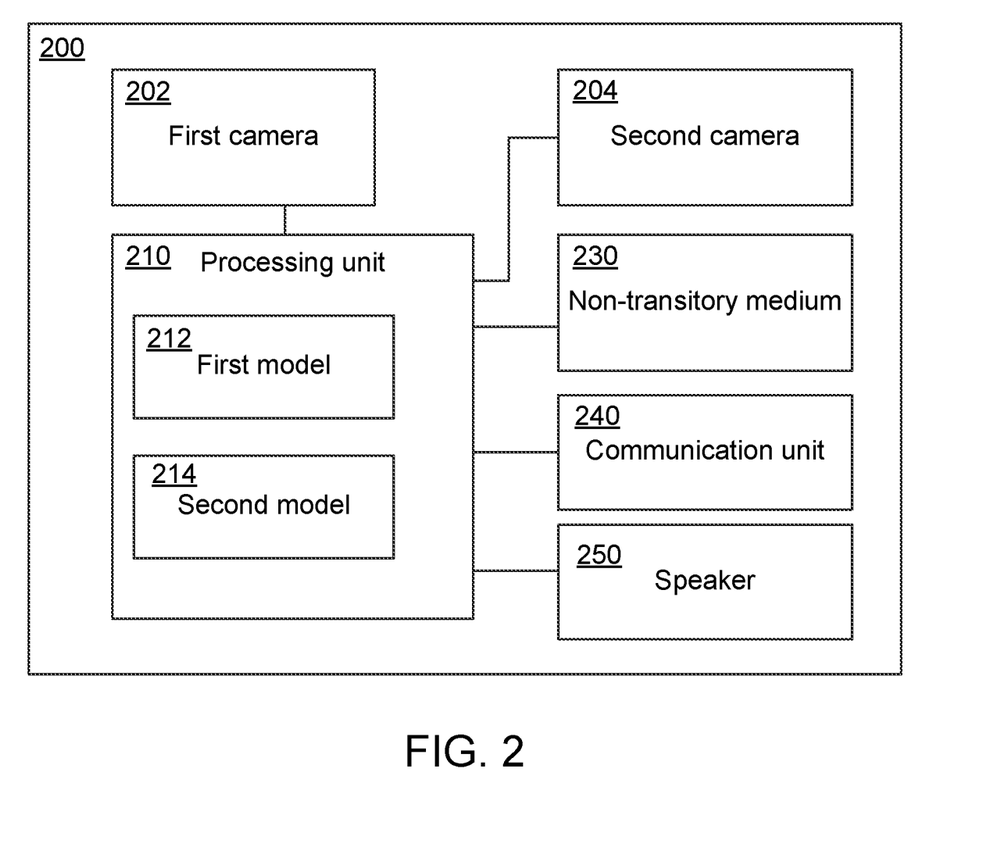
FIG. 2 illustrates a block diagram of the apparatus of FIG. 1 in accordance with some embodiments.

FIG. 2 illustrates a block diagram of the apparatus 200 of FIG. 1 in accordance with some embodiments. The apparatus 200 includes the first camera 202 and the second camera 204. As shown in the figure, the apparatus 200 also includes a processing unit 210 coupled to the first camera 202 and the second camera 204, a non-transitory medium 230 configured to store data, a communication unit 240 coupled to the processing unit 210, and a speaker 250 coupled to the processing unit 210.

In the illustrated embodiments, the first camera 202, the second camera 204, the processing unit 210, the non-transitory medium 230, the communication unit 240, and the speaker 250 may be integrated as parts of an aftermarket device for the vehicle. In other embodiments, the first camera 202, the second camera 204, the processing unit 210, the non-transitory medium 230, the communication unit 240, and the speaker 250 may be integrated with the vehicle, and may be installed in the vehicle during a manufacturing process of the vehicle.

The processing unit 210 is configured to obtain images from the first camera 202 and images from the second camera 204, and process the images from the first and second cameras 202, 204. In some embodiments, the images from the first camera 202 may be processed by the processing unit 210 to monitor an environment outside the vehicle (e.g., for collision detection, collision prevention, driving environment monitoring, etc.). Also, in some embodiments, the images from the second camera 204 may be processed by the processing unit 210 to monitor a driving behavior of the driver (e.g., whether the driver is distracted, drowsy, focused, etc.). As shown in the figure, the processing unit 210 includes a first model 212 and a second model 214 that are configured to operate together to detect drowsiness of the driver. Embodiments of techniques for detecting drowsiness will be further described below. In further embodiments, the processing unit 210 may process images from the first camera 202 and/or the second camera 204 to determine a risk of collision, to predict the collision, to provision alerts for the driver, etc. For example, the apparatus 200 may provide an audio alert (one or more beeps, an alarm, a voice message, etc.) via the speaker 250. In other embodiments, the apparatus 200 may not include the first camera 202. In such cases, the apparatus 200 is configured to monitor only the environment inside a cabin of the vehicle.

The processing unit 210 of the apparatus 200 may include hardware, software, or a combination of both. By means of non-limiting examples, hardware of the processing unit 210 may include one or more processors and/or more or more integrated circuits. In some embodiments, the processing unit 210 may be implemented as a module and/or may be a part of any integrated circuit.

The non-transitory medium 230 is configured to store data relating to operation of the processing unit 210. In the illustrated embodiments, the non-transitory medium 230 is configured to store one or more models (e.g., the models 212, 214), which the processing unit 210 can access and utilize to identify pose(s) of a driver as appeared in images from the camera 204, and/or to determine whether the driver is drowsy or not. Alternatively, the model(s) may configure the processing unit 210 so that it has the capability to identify pose(s) of the driver and/or to determine whether the driver is drowsy or not. Optionally, the non-transitory medium 230 may also be configured to store image(s) from the first camera 202, and/or image(s) from the second camera 204. Also, in some embodiments, the non-transitory medium 230 may also be configured to store data generated by the processing unit 210.

The model(s) stored in the transitory medium 230 may be any computational model(s) or processing model(s), including but not limited to neural network model(s). In some embodiments, a model may include feature extraction parameters, based upon which, the processing unit 210 can extract features from images provided by the camera 204 for identification of objects, such as a driver's head, a hat, a face, a nose, an eye, a mobile device, etc. Also, in some embodiments, the model(s) may include program instructions, commands, scripts, etc. In one implementation, the model(s) may be in a form of an application that can be received wirelessly by the apparatus 200.

The communication unit 240 of the apparatus 200 is configured to receive data wirelessly from a network, such as a cloud, the Internet, Bluetooth network, etc. In some embodiments, the communication unit 240 may also be configured to transmit data wirelessly. For example images from the first camera 202, images from the second camera 204, data generated by the processing unit, or any combination of the foregoing, may be transmitted by the communication unit 240 to another device (e.g., a server, an accessory device such as a mobile phone, another apparatus 200 in another vehicle, etc.) via a network, such as a cloud, the Internet, Bluetooth network, etc. In some embodiments, the communication unit 240 may include one or more antennas. For example, the communication 240 may include a first antenna configured to provide long-range communication, and a second antenna configured to provide near-field communication (such as via Bluetooth). In other embodiments, the communication unit 240 may be configured to transmit and/or receive data physically through a cable or electrical contacts. In such cases, the communication unit 240 may include one or more communication connectors configured to couple with a data transmission device. For example, the communication unit 240 may include a connector configured to couple with a cable, a USB slot configured to receive a USB drive, a memory-card slot configured to receive a memory card, etc.

In some embodiments, the first model 212 and the second model 214 may be transmitted from a server, and may be received by the apparatus 200 via the communication unit 240.

The speaker 250 of the apparatus 200 is configured to provide audio alert(s) and/or message(s) to a driver of the vehicle. For example, in some embodiments, the processing unit 210 may be configured to detect an imminent collision between the vehicle and an object outside the vehicle. In such cases, in response to the detection of the imminent collision, the processing unit 210 may generate a control signal to cause the speaker 250 to output an audio alert and/or message. As another example, in some embodiments, the processing unit 210 may be configured to determine whether the driver is drowsy or not. If the driver is drowsy, the processing unit 210 may generate a control signal to cause the speaker 250 to output an audio alert and/or message.

Although the apparatus 200 is described as having the first camera 202 and the second camera 204, in other embodiments, the apparatus 200 may include only the second camera (cabin camera) 204, and not the first camera 202. Also, in other embodiments, the apparatus 200 may include multiple cameras configured to view the cabin inside the vehicle.

Figure 3:
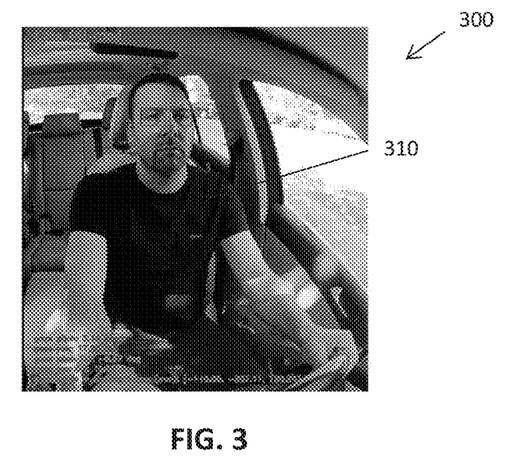
FIG. 3 illustrates an example of an image captured by a camera of the apparatus of FIG. 2.

During use, the apparatus 200 is coupled to a vehicle such that the first camera 202 is viewing outside the vehicle, and the second camera 204 is viewing a driver inside the vehicle. While the driver operates the vehicle, the first camera 202 captures images outside the vehicle, and the second camera 204 captures images inside the vehicle. FIG. 3 illustrates an example of an image 300 captured by the second camera 204 of the apparatus 200 of FIG. 2. As shown in the figure, the image 300 from the second camera 204 may include an image of a driver 310 operating the subject vehicle (the vehicle with the apparatus 200). The processing unit 210 is configured to processing images (e.g., the image 300) from the camera 204, and to determine whether the driver is drowsy or not based on the processing of the images. In some embodiments, the processing unit 210 may also process images from the camera 204 to determine whether the driver is distracted or not. In further embodiments, the processing unit 210 may also process images from the camera 202 to determine a collision risk.

Figure 4:
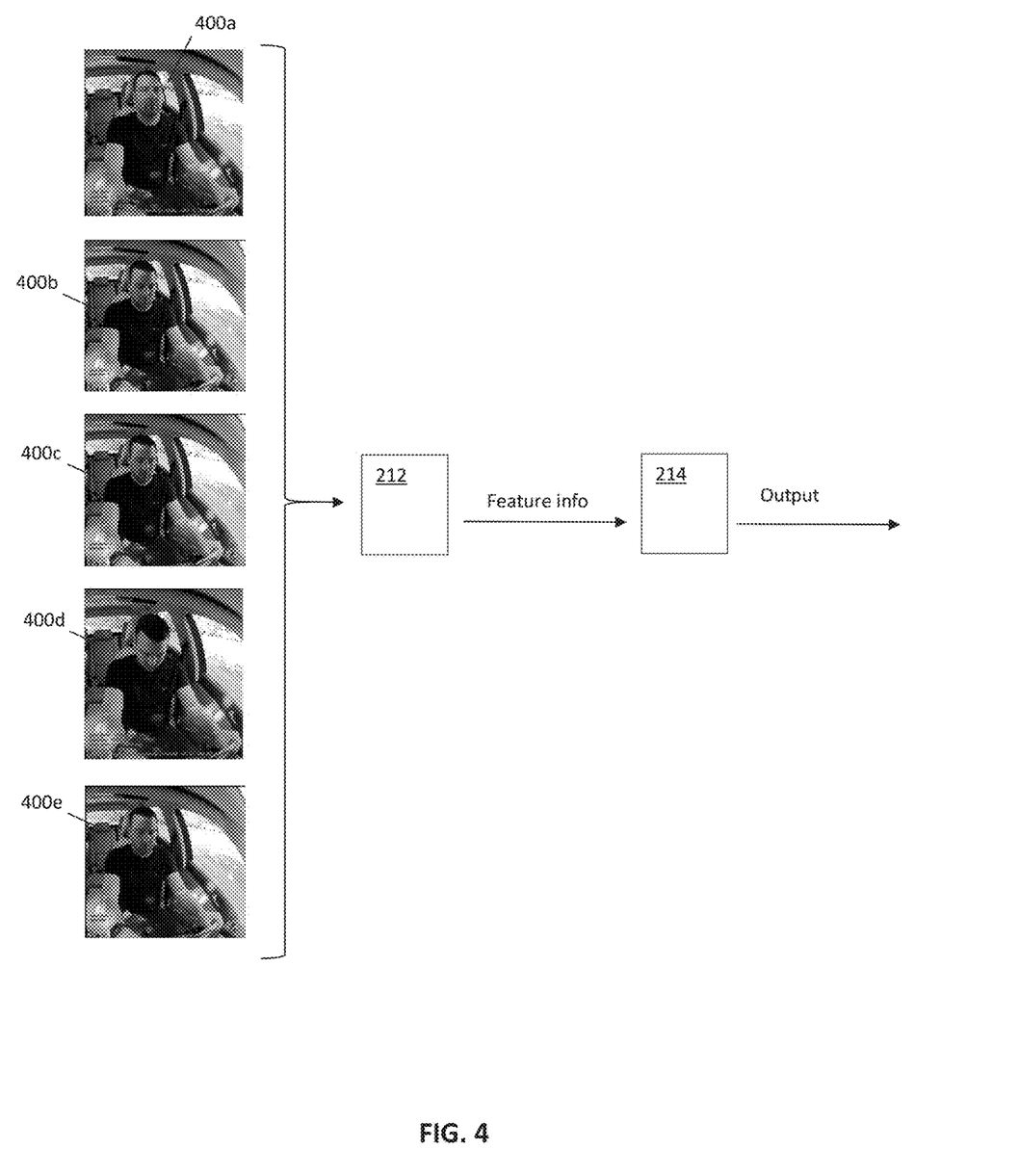
FIG. 4 illustrates an example of a processing architecture having a first model and a second model coupled in series.

FIG. 4 illustrates an example of a processing architecture having the first model 212 and the second model 214 coupled in series. The first and second models 212, 214 are in the processing unit 210, and/or may be considered as parts of the processing unit 210. Although the models 212, 214 are shown schematically to be in the processing unit 210, in some embodiments, the models 212, 214 may be stored in the non-transitory medium 230. In such cases, the models 212, 214 may still be considered as a part of the processing unit 210. As shown in the example, a sequence of images 400a-400e from the camera 204 are received by the processing unit 210. The first model 212 of the processing unit 210 is configured to process the images 400a-400e. In some embodiments, the first model 212 is configured to determine one or more poses for a corresponding one of the images 400a-400e. For example, the first model 212 may analyze the image 400a and may determine that the driver has a "opened-eye(s)" pose and a "head-straight" pose. The first model 212 may analyze the image 400b and may determine that the driver has a "closed-eye(s)" pose. The first model 212 may analyze the image 400c and may determine that the driver has a "closed-eye(s)" pose. The first model 212 may analyze the image 400d and may determine that the driver has a "closed-eye(s)" pose and a "head-down" pose. The first model 212 may analyze the image 400e and may determine that the driver has a "closed-eye(s)" pose and a "head-straight" pose. Although only five images 400a-400e are shown, in other examples, the sequence of images received by the first model 212 may be more than five. In some embodiments, the camera 202 may have a frame rate of at least 10 frames per second (e.g., 15 fps), and the first model 212 may continue to receive images from the camera 202 at that rate for the duration of the operation of the vehicle by the driver.

In some embodiments, the first model may be a single model utilized by the processing unit 210 to provide multiple pose classifications. The multiple pose classifications may be outputted by the processing unit 210 in parallel or in sequence. In other embodiments, the first model may comprise multiple sub-models, with each sub-model being configured to detect a specific classification of pose. For example, there may be a sub-model that detects face, a sub-model that detects head-up pose, a sub-model that detects head-down pose, a sub-model that detects closed-eye(s) pose, a sub-model that detects head-straight pose, a sub-model that detects opened-eye(s) pose, etc.

In some embodiments, the first model 212 of the processing unit 210 is configured to determine metric values for multiple respective pose classifications. The first model 212 of the processing unit 210 is also configured to compare the metric values with respective thresholds for the respective pose classifications. In such cases, the processing unit 210 is configured to determine the driver as belonging to one of the pose classifications if the corresponding one of the metric values meets or surpasses the corresponding one of the thresholds. For example, the thresholds for the different pose classifications may be set to 0.6. In such cases, if any of the metric values for any of the pose classifications exceeds 0.6, then the processing unit 210 may determine that the driver as having a pose belonging to the pose classification (i.e., the one with the metric value exceeding 0.6).

In the above examples, the same pre-set threshold is implemented for the different respective pose classifications. In other embodiments, at least two of the thresholds for the at least two respective pose classifications may have different values. Also, in the above examples, the metric values for the pose classifications have a range from 0.0 to 1.0, with 1.0 being the highest. In other embodiments, the metric values for the pose classifications may have other ranges. Also, in other embodiments, the convention of the metric values may be reversed in that a lower metric value may indicate that the driver is meeting a certain pose classification, and a higher metric value may indicate that the driver is not meeting a certain pose classification.

As discussed, in some embodiments, the first model 212 is configured to process images of the driver from the camera 204, and to determine whether the driver belongs to certain pose classifications. The pose classifications may belong to a "drowsiness" class, in which each of the pose classifications may indicate sign of drowsiness. By means of non-limiting examples, the pose classification(s) in the "drowsiness" class may be one or more of: head-down pose, closed-eye(s), etc., or any of other poses that would be helpful in determining whether the driver is drowsy. Alternatively or additionally, the pose classifications may belong to an "alertness" class, in which each of the pose classifications may indicate sign of alertness. By means of non-limiting examples, the pose classification(s) may be one or more of: cellphone-usage pose, etc., or any of other poses that would be helpful in determining whether the driver is drowsy or not. In some embodiments, certain poses may belong to both "drowsiness" class and "alertness" class. For example, head-straight and open-eye(s) pose may belong to both classes.

As shown in the figure, the pose identifications (or classifications) may be outputted by the first model 212 as feature information. The second model 214 obtains the feature information from the first model 212 as input, and processes the feature information to determine whether the driver is drowsy or not. The second model 214 also generates an output indicating whether the driver is drowsy or not.

In some embodiments, the feature information outputted by the first model 212 may be a time series of data. The time series of data may be pose classifications of the driver for the different images 400 at the different respective times. In particular, as images are generated sequentially one-by-one by the camera 204, the first model 212 processes the images sequentially one-by-one to determine pose(s) for each image. As pose classification(s) is determined for each image by the first model 212, the determined pose classification(s) for that image is then outputted by the first model 212 as feature information. Thus, as images are received one-by-one by the first model 212, feature information for the respective images are also outputted one-by-one sequentially by the first model 212.

Figure 5:
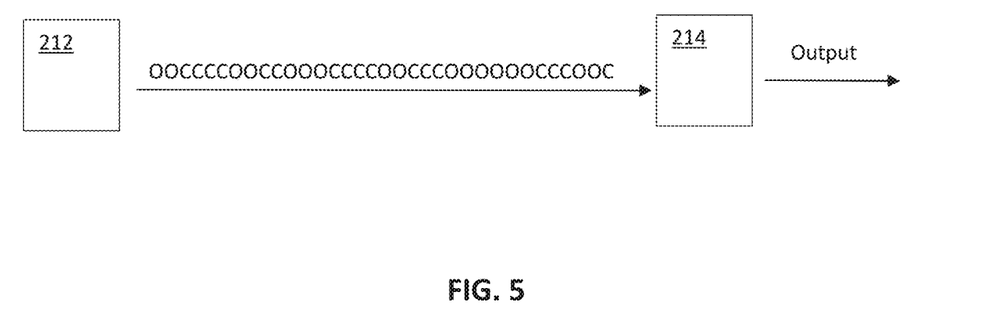
FIG. 5 illustrates an example of feature information received by the second model.

FIG. 5 illustrates an example of feature information received by the second model 214. As shown in the figure, the feature information includes pose classifications for the different respective images in a sequence, wherein "O" indicates that the driver has an "opened-eye(s)" pose in the image, and "C" indicates that the driver has a "closed-eye(s)" pose in the image. As the sequence of feature information is obtained by the second model 214, the second model 214 analyzes the feature information to determine whether the driver is drowsy or not. In one implementation, the second model 214 may be configured (e.g., programmed, made, trained, etc.) to analyze the pattern of the feature information, and determine whether it is a pattern that is associated with drowsiness (e.g., a pattern indicating drowsiness). For example, the second model 214 may be configured to determine blink rate, eye closure duration, time took to achieve eyelid closure, PERCLOS, or any of other metric(s) that measures or indicates alertness or drowsiness, based on the time series of feature information.

In some embodiments, if the blink rate has a value that surpasses a blink rate threshold value associated with drowsiness, then the processing unit 210 may determine that the driver is drowsy.

Alternatively or additionally, if the eye closure duration has a value that surpasses an eye closure duration threshold value associated with drowsiness, then the processing unit 210 may determine that the driver is drowsy. A person who is drowsy may have a longer eye closure duration compared to a person who is alert.

Alternatively or additionally, if the time it took to achieve eyelid closure has a value that surpasses a time threshold value associated with drowsiness, then the processing unit 210 may determine that the driver is drowsy. It should be noted that the time it took to achieve eyelid closure is a time interval between a state of the eyes being substantially opened (e.g., at least 80% opened, at least 90% opened, 100% opened, etc.) until the eyelids are substantially closed (e.g., at least 70% closed, at least 80% closed, at least 90% closed, 100% closed, etc.). It is a measure of a speed of the closing of the eyelid. A person who is drowsy tends to have a slower speed of eyelid closure compared to a person who is alert.

Alternatively or additionally, if the PERCLOS has a value that surpasses a PERCLOS threshold value associated with drowsiness, then the processing unit 210 may determine that the driver is drowsy. It should be noted that PERCLOS is a drowsiness metric that indicates the proportion of time in a minute that the eyes are at least 80 percent closed. PERCLOS is the percentage of eyelid closure over the pupil over time and reflects slow eyelid closures rather than blinks.

Figure 6:
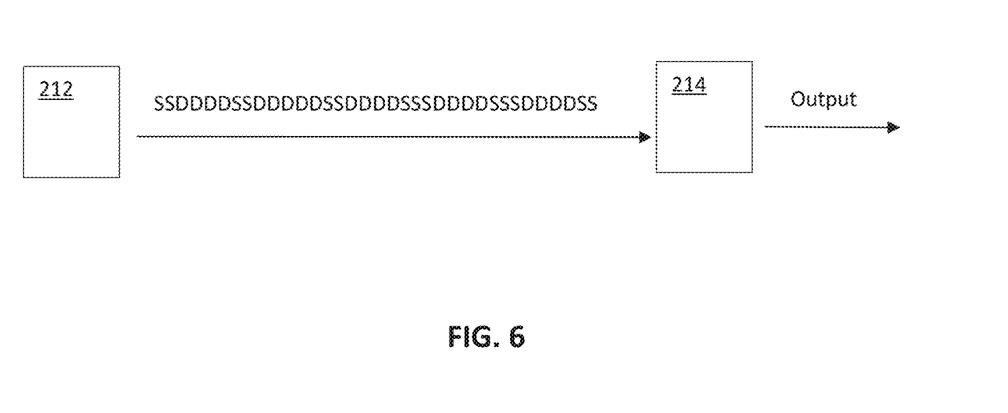
FIG. 6 illustrates another example of feature information received by the second model.

It should be noted that the feature information provided by the first model 212 to the second model 214 is not limited to the examples of pose classifications described in FIG. 5, and that the feature information utilized by the second model 214 for detecting drowsiness may include other pose classifications. FIG. 6 illustrates another example of feature information received by the second model 214. As shown in the figure, the feature information includes pose classifications for the different respective images in a sequence, wherein "S" indicates that the driver has a "head straight" pose in the image, and "D" indicates that the driver has a "head down" pose in the image. As the sequence of feature information is obtained by the second model 214, the second model 214 analyzes the feature information to determine whether the driver is drowsy or not. For example, if the "head straight" and "head down" pose classifications repeated in a certain pattern that is associated with drowsiness, then the processing unit may determine that the driver is drowsy. In one implementation, the second model 214 may be configured (e.g., programmed, made, trained, etc.) to analyze the pattern of the feature information, and determine whether it is a pattern that is associated with drowsiness (e.g., a pattern indicating drowsiness).

In some embodiments, the feature information provided by the first model 212 to the second model 214 may have a data structure that allows different pose classifications to be associated with different time points. Also, in some embodiments, such data structure may also allow one or more pose classifications to be associated with a particular time point.

Also, in some embodiments, the output of the first model 212 may be a numerical vector (e.g., a low dimensional numerical vector, such as embedding) that provides a numerical representation of pose(s) detected by the first model 212. The numerical vector may not be interpretable by a human, but may provide information regarding detected pose(s).

In some embodiments, the first model 212 may be a neural network model. In such cases, the neural network model may be trained based on images of other drivers. For example, the neural network model may be trained using images of drivers to identify different poses, such as head-down pose, head-up pose, head-straight pose, closed-eye(s) pose, opened-eye(s) pose, cellphone-usage pose, etc. In other embodiments, the first model 212 may be any of other types of model that is different from neural network model.

Also, in some embodiments, the second model 214 may be a neural network model. In such cases, the neural network model may be trained based on feature information. For example, the feature information may be any information indicating a state of a driver, such as pose classification. In one implementation, the neural network model may be trained using feature information output by the first model 212. In other embodiments, the second model 214 may be any of other types of model that is different from neural network model.

In some embodiments, the first model 212 utilized by the processing unit 210 to identify pose(s) for the driver may be a convolutional neural network model. In other embodiments, the first model 212 may be simply any mathematical model. Also, in some embodiments, the second model 214 utilized by the processing unit 210 to determine whether the driver is drowsy or not may be a convolutional neural network model. In other embodiments, the second model 214 may be simply any mathematical model.

In some embodiments, the first model 212 may be a first neural network model trained to classify pose(s) based on context. For example, if the driver's head is facing down, then the neural network model may determine that the driver is not looking straight even if the eyes of the driver cannot be detected (e.g., because the eyes may be blocked by a hat/cap). Also, in some embodiments, the second model 214 may be a second neural network model trained to determine whether the driver is drowsy or not based on context. For example, if the blink rate exceeds a certain threshold, and/or if the head-down pose and head-straight pose repeats in a period pattern, then the neural network model may determine that the driver is drowsy. As another example, if the time it took to achieve eyelid closure exceeds a certain threshold, then the neural network model may determine that the driver is drowsy.

In some embodiments, deep learning or artificial intelligence may be used to develop one or more models that identifies pose(s) for the driver and/or to determine whether the driver is drowsy or not. Such model(s) can distinguish a driver who is drowsy from a driver who is alert.

It should be noted that the processing unit 210 is not limited to using neural network model(s) to determine pose classification(s) and/or whether a driver is drowsy or not, and that the processing unit 210 may utilized any processing technique, algorithm, or processing architecture to determine pose classification(s) and/or whether a driver is drowsy or not. By means of non-limiting examples, the processing unit 210 may utilize equations, regression, classification, neural networks (e.g., convolutional neural networks, deep neural networks), heuristics, selection (e.g., from a library, graph, or chart), instance-based methods (e.g., nearest neighbor), correlation methods, regularization methods (e.g., ridge regression), decision trees, Baysean methods, kernel methods, probability, deterministics, or a combination of two or more of the above, to process image(s) from the camera 204 to determine pose classification(s) and/or to process time series of feature information to determine whether a driver is drowsy or not. A pose classification can be a binary classification or binary score (e.g., head down or not), a score (e.g., continuous or discontinuous), a classification (e.g., high, medium, low), or may be any other suitable measure of pose classification. Similarly, a drowsiness classification can be a binary classification or binary score (e.g., drowsy or not), a score (e.g., continuous or discontinuous), a classification (e.g., high, medium, low), or may be any other suitable measure of drowsiness.

In some embodiments, the determination of whether a driver is drowsy or not may be accomplished by analyzing a pattern of pose classifications of the driver that occur over a period, such as a period that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc. The period may be any pre-determined time duration of a moving window or moving box (for identifying data that was generated in the last time duration, e.g., data in the last fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc.).

In some embodiments, the first model 212 and the second model 214 may be configured to operate together to detect "micro sleep" event, such as slow eyelid closure that occurs over a duration of sub-second, between 1 to 1.5 second or more than 2 seconds. In other embodiments, the first model 212 and the second model 214 may be configured to operate together to detect early sign(s) of drowsiness based on images captured in a longer period, such as a period that is longer than 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc.

As illustrated in the above examples, using multiple sequential models to detect drowsiness is advantageous. In particular, the technique of combining the use of (1) the first model to process camera images (one-by-one as each camera image is generated) to identify driver's poses, and (2) the second model to process feature information resulted from processing of camera images by the first model, obviates the need for the processing unit 210 to collect a sequence of images in a batch, and to process the batch of camera images (video) together. This saves significant computational resource and memory space. In addition, as described in the above examples, the second model does not process images from the camera. Instead, the second model receives feature information as output from the first model, and process the feature information to determine whether the driver is drowsy or not. This is advantageous because processing feature information is easier and faster than processing a batch of camera images. Also, context-based classification is advantageous because it allows the processing unit 210 to identify different poses of the driver accurately. In some cases, even if the apparatus 200 is mounted at very off angle with respect to the vehicle (which may result in the driver appearing at odd angles and/or positions in the camera images), context-based identification will still allow the processing unit 210 to correctly identify poses of the driver. Aftermarket products may be mounted in different positions. The features described herein are also advantageous because they allow determination of whether the driver is drowsy or not even if the apparatus 200 is mounted at different angles.

It should be noted that the processing unit 210 is not limited to detecting poses indicating that the driver is drowsy (e.g., poses belonging to "drowsiness" class). In other embodiments, the processing unit 210 may be configured to detect poses indicating that the driver is alert (e.g., poses belonging to "alertness" class). In further embodiments, the processing unit 210 may be configured to detect both (1) poses indicating that the driver is drowsy, and (2) poses indicating that the driver is alert.

In some embodiments, the processing unit 210 may obtain (e.g., by receiving or determining) additional parameter(s) for determining whether the driver is drowsy or not. By means of non-limiting examples, the processing unit 210 may be configured to obtain acceleration of the vehicle, deceleration of the vehicle, vehicle position with respect to the driving lane, information regarding driver participation in the driving, etc. In some cases, one or more of the above parameters may be obtained by the second model 214, which then determines whether the driver is drowsy or not based on the output from the first model 212, as well as based on such parameter(s). It should be noted that acceleration, deceleration, and information regarding driver participation are indicators of whether the driver is actively driving or not. For example, if the driver is changing speed or turning the steering wheel, then the driver is less likely to be drowsy. In some embodiments, sensors built within the vehicle may provide acceleration and deceleration information. In such cases, the processing unit 210 may be hardwired to the vehicle system for receiving such information. Alternatively, the processing unit 210 may be configured to receive such information wirelessly. In further embodiments, the apparatus 200 comprising the processing unit 210 may optionally further include an accelerometer for detecting acceleration and deceleration. In such cases, the second model 214 may be configured to obtain the acceleration and/or deceleration information from the accelerometer. Also, information regarding driver participation may be any information indicating that the driver is or is not operating the vehicle. By means of non-limiting examples, such information may include one or more of: turning of steering wheel or lack thereof, activating of turning light lever or lack thereof, changing of gear or lack thereof, braking or lack thereof, pressing of acceleration pedal or lack thereof, etc. In some embodiments, information regarding driver participation may be information regarding driver participation that occurs within a certain past duration of time (e.g., within the last 10 seconds or longer, last 20 seconds or longer, last 30 seconds or longer, last 1 minute or longer, etc.).

In addition, in some embodiments, the vehicle position with respect to the driving lane may be determined by the processing unit 210 processing images from the external facing camera 202. In particular, the processing unit 210 may be configured to determine whether the vehicle is traveling within a certain threshold from a center line of the lane. If the vehicle is traveling within the certain threshold from the center line of the lane, that means the driver is actively participating in the driving. On the other hand, if the vehicle is drifting away from the center line of the lane past the threshold, that means the driver may not be actively participating in the driving. In some embodiments, the second model 214 may be configured to receive images from the first camera 202, and to determine whether the vehicle is traveling within a certain threshold from the center line of the lane. In other embodiments, another module may be configured to provide this feature. In such cases, the output of the module is input to the second model 214 for allowing the model 214 to determine whether the driver is drowsy or not based on the output of the module.

Also, in one or more embodiments described herein, the processing unit 210 may be further configured to determine a collision risk based on whether the driver is drowsy or not. In some embodiments, the processing unit 210 may be configured to determine the collision risk based solely on whether the driver is drowsy or not. For example, the processing unit 210 may determine that the collision risk is "high" if the driver is drowsy, and may determine that the collision risk is "low" if the driver is not drowsy (e.g., alert). In other embodiments, the processing unit 210 may be configured to determine the collision risk based on additional information. For example, the processing unit 210 may be configured to keep track how long the driver has been drowsy, and may determine a level of collision risk based on a duration of the drowsiness.

As another example, the processing unit 210 may process images from the first camera 202 to determine an output, and may determine the collision risk based on such output and in combination of the pose classification(s) and/or drowsiness determination. By means of non-limiting examples, the output may be a classification of driving condition, a classification of the external environment, a determined feature of the environment, a context of an operation of the vehicle, etc. For examples, in some embodiments, the camera images capturing the outside environment of the vehicle may be processed by the processing unit 210 to determine whether the vehicle is turning left, moving straight, turning right, whether there is an obstacle (e.g., a vehicle, a pedestrian, etc.) in front of the subject vehicle, etc. If the vehicle is turning, and/or if there is an obstacle detected in the travelling path of the vehicle, while drowsiness is detected, the processing unit 210 may then determine that the collision risk is high.

It should be noted that the second model 214 of the processing unit 210 is not limited to receiving only output from the first model 212. The second model 214 may be configured to receive other information (as input(s)) that are in addition to the output from the first model 212. For example, in other embodiments, the second model 214 may be configured to receive sensor signals from one or more sensors mounted to a vehicle, wherein the sensor(s) is configured to sense information about movement characteristic(s) and/or operation characteristic(s) of the vehicle. By means of non-limiting examples, the sensor signals obtained by the second model 214 may be accelerometer signals, gyroscope signals, speed signals, location signals (e.g., GPS signals), etc., or any combination of the foregoing. In further embodiments, the processing unit 210 may include a processing module that processes the sensor signals. In such cases, the second model 214 may be configured to receive the processed sensor signals from the processing module. In some embodiments, the second model 214 may be configured to process the sensor signals (provided by the sensor(s)) or the processed sensor signals (provided from the processing module) to determine a collision risk. The determination of the collision risk may be based on drowsiness detection and the sensor signals. In other embodiments, the determination of the collision risk may be based on drowsiness detection, the sensor signals, and images of surrounding environment outside the vehicle captured by the camera 202.

Also, in some embodiments, the processing unit 210 may include a facial landmark(s) detection module configured to detect one or more facial landmarks of the driver as captured in images of the camera 204. In such cases, the second model 214 may be configured to receive output from the facial landmark(s) detection module. In some cases, the output from the facial landmark(s) detection module may be utilized by the second model 214 to determine drowsiness and/or alertness. Alternatively or additionally, the output from the facial landmark(s) detection module may be used to train the second model 214.

Also, in some embodiments, the processing unit 210 may include an eye landmark(s) detection module configured to detect one or more eye landmarks of the driver as captured in images of the camera 204. In such cases, the second model 214 may be configured to receive output from the eye landmark(s) detection module. In some cases, the output from the eye landmark(s) detection module may be utilized by the second model 214 to determine drowsiness and/or alertness. Alternatively or additionally, the output from the eye landmark(s) detection module may be used to train the second model 214. An eye landmark may be a pupil, an eyeball, an eyelid, etc., or any feature associated with an eye of a driver.

In some embodiments, if the second model 214 is configured to receive one or more other information that are in addition to the output from the first model 212, the second model 214 may be configured to receive the one or more information, and the output from the first model 212 in parallel. This allows different information to be received by the second model 214 independently and/or simultaneously.

Figure 7:
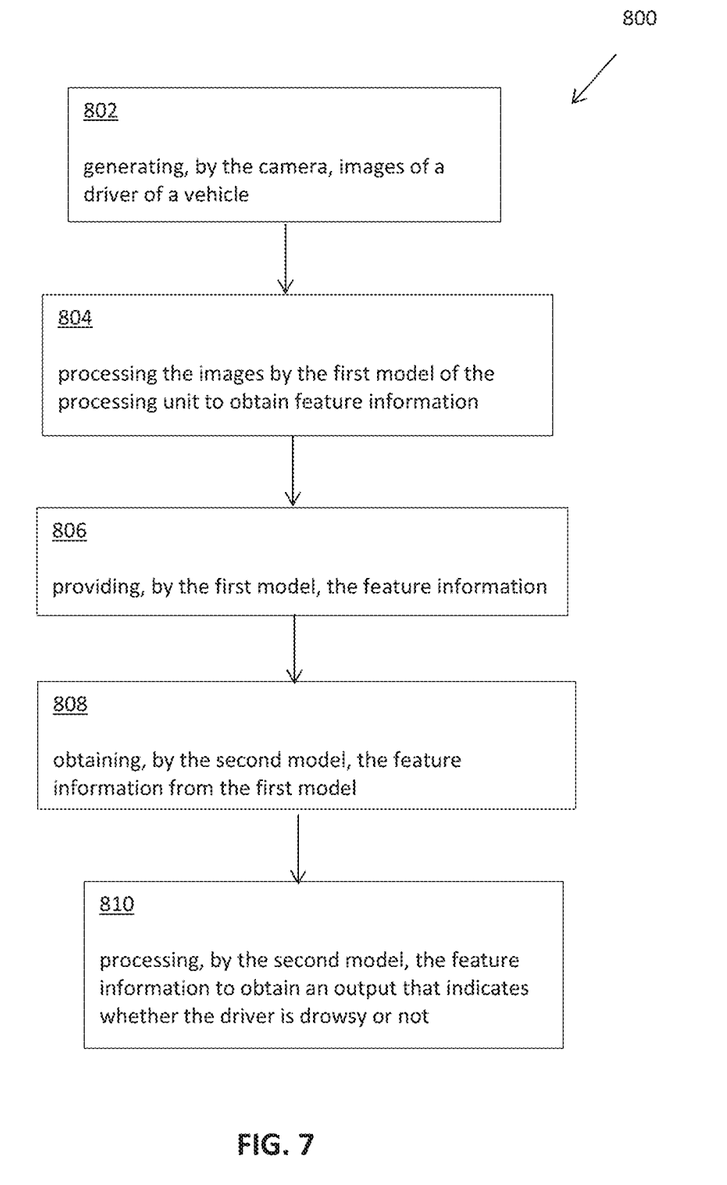
FIG. 7 illustrates a method performed by the apparatus of FIG. 2 in accordance with some embodiments.

FIG. 7 illustrates a method 800 performed by the apparatus 200 of FIG. 2 in accordance with some embodiments. The method 800 includes: generating, by the camera, images of a driver of a vehicle (item 802); processing the images by the first model of the processing unit to obtain feature information (item 804); providing, by the first model, the feature information (item 806); obtaining, by the second model, the feature information from the first model (item 808); and processing, by the second model, the feature information to obtain an output that indicates whether the driver is drowsy or not (item 810).

Optionally, in the method 700, the first model comprises a first neural network model.

Optionally, in the method 700, the images are processed by the first neural network model to identify one or more poses of the driver.

Optionally, in the method 700, the second model comprises a second neural network model that is coupled in series with respect to the first neural network model.

Optionally, in the method 700, the images are processed by the first neural network model to identify poses of the driver over a duration, and wherein the feature information is in a time series and indicates the identified poses of the driver over the duration; and wherein the act of processing the feature information comprises processing the time series to determine whether the driver is drowsy or not.

Optionally, in the method 700, the feature information is in a time series.

Optionally, in the method 700, the feature information includes information regarding eye closure of the driver.

Optionally, in the method 700, the feature information is processed by the second model to determine whether the driver is drowsy or not based on a blink rate, a percentage-of-eyes-closed metric, a duration of eyes closed, time took to achieve eyelid closure, poses of the driver, or any combination of the foregoing.

Optionally, the method 700 further includes obtaining information regarding a driving participation by the driver, wherein the output that indicates whether the driver is drowsy or not is also based on the information regarding the driving participation by the driver.

Optionally, in the method 700, the camera has a frame rate that is at least 10 frames per second.

Optionally, in the method 700, the feature information cover features of the driver that occur over a duration that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, or 40 minutes.

Optionally, the method 700 further includes storing the first model and the second model in a non-transitory medium.

Optionally, the method 700 further includes, obtaining the first model and the second model by a communication unit.

Optionally, in the method 700, the first model is trained based on images of other drivers.

Optionally, the method 700 further includes determining a collision risk based on whether the driver is drowsy or not.

Optionally, in the method 700, the camera and the processing unit are integrated as parts of an aftermarket device for the vehicle.

Optionally, in the method 700, the aftermarket device includes an additional camera configured to view an environment outside the vehicle.

Figure 8:
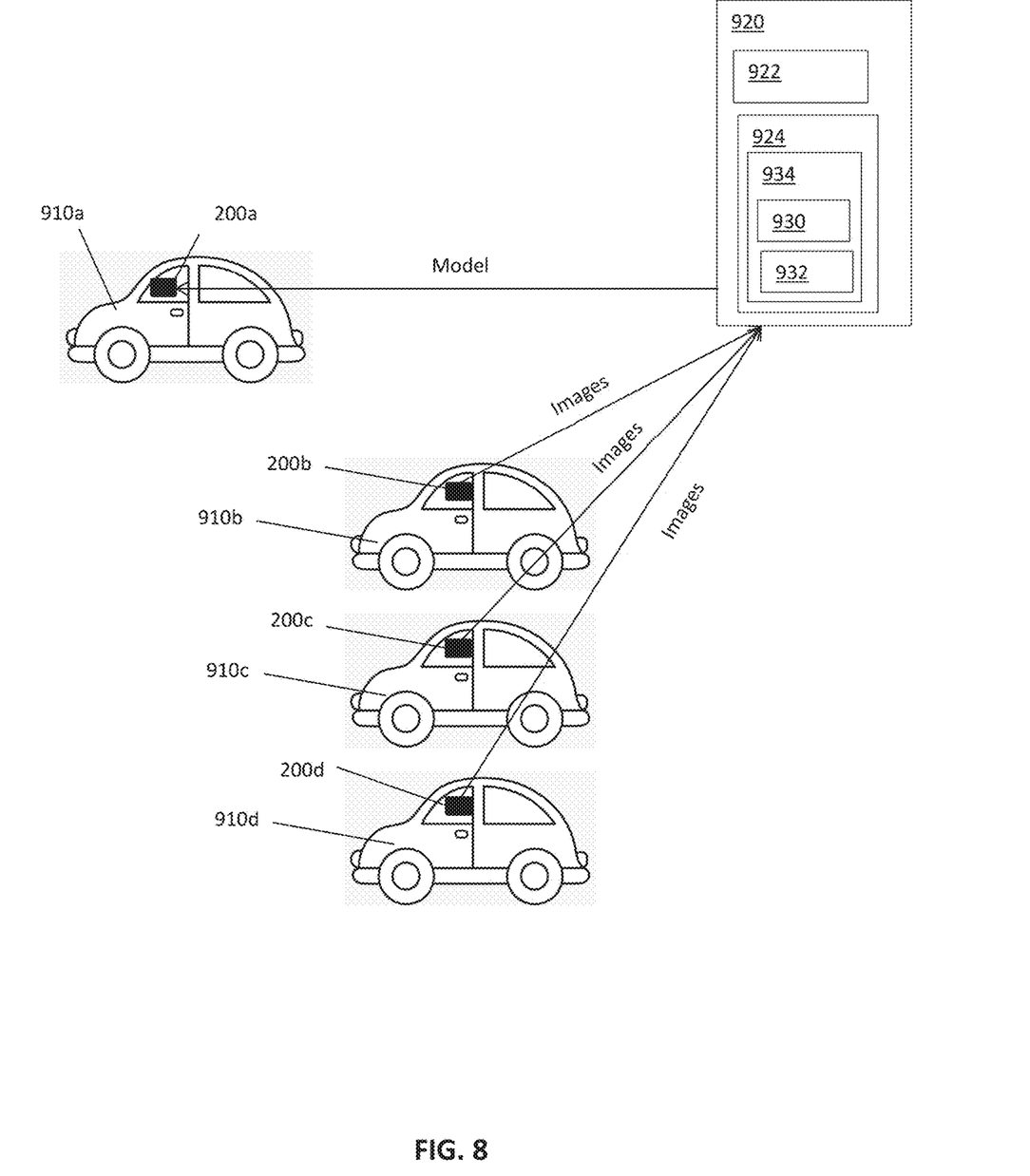
FIG. 8 illustrates a technique of determining one or more models for use by the apparatus of FIG. 2 in accordance with some embodiments.

FIG. 8 illustrates a technique of determining one or more models for use by the apparatus 200 in accordance with some embodiments. As shown in the figure, there may be multiple vehicles 910*a*-910*d* with respective apparatuses 200*a*-200*d*. Each of the apparatuses 200*a*-200*d* may have the configuration and features described with reference to the apparatus 200 of FIG. 2. During use, cameras of the apparatuses 200*b*-200*d* in the vehicles 910*b*-910*d* capture images of the drivers of the respective vehicles 910*b*-910*d*. The images are transmitted, directly or indirectly, to a server 920 via a network (e.g., a cloud, the Internet, etc.).

The server 920 includes a processing unit 922 configured to process the images from the apparatuses 200*b*-300*d* in the vehicles 910*b*-910*d* to determine (e.g., configure) a first model 930. The first model 930 may then be stored in a non-transitory medium 924 in the server 920. In some embodiments, the first model 930 may be a first neural network model trained to identify different poses of drivers as captured in images. The first neural network model is configured to receive camera images as input, and provide pose classifications as output. In some embodiments, the first model 930 may be the first model 212 described with reference to FIGS. 2 and 4.

Returning to FIG. 8, the processing unit 922 of the server 920 is also configured to determine a second model 932. The second model 932 may be stored in the non-transitory medium 924. In some embodiments, the second model 932 may be a second neural network model trained to detect driver's drowsiness. The second neural network model is configured to receive feature information (such as pose classifications from the first neural network model) as input, and provide an output indicating whether a driver is drowsy or not. In some embodiments, the second model 932 may be the second model 214 described with reference to FIGS. 2 and 4.

The first model 930 and the second model 932 may collectively form a combined model 934, which is stored in the non-transitory medium 924.

In some embodiments, the processing unit 922 of the server 920 uses the images to configure (e.g., to train) the first model 930 to identify certain poses of drivers. By means of non-limiting examples, the first model 930 may be configured to identify whether a driver has a "head-down" pose, a "head-up" pose, a "head-straight" pose, "closed-eye(s)" pose, "opened-eye(s)" pose, "cellphone-usage" pose, etc., or any other pose(s) that may form a part of a pattern for assisting detection of drowsiness or not. Also, in some embodiments, the processing unit 922 of the server 920 may use feature information, such as the pose classification of driver(s) from the first model 930, to configure the second model 932 to determine whether a driver is drowsy or not. In some embodiments, the determination of whether a driver is drowsy or not may be accomplished by analyzing a pattern of pose classifications of the driver that occur over a period, such as a period that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc. The period may be any pre-determined time duration of a moving window or moving box (for identifying data that was generated in the last time duration, e.g., data in the last fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc.).

In some embodiments, the first model 930 and the second model 932 may be configured to operate together to detect "micro sleep" event, such as slow eyelid closure that occurs over a duration of sub-second, between 1 to 1.5 second or more than 2 seconds. In other embodiments, the first model 930 and the second model 932 may be configured to operate together to detect early sign(s) of drowsiness based on images captured in a longer period, such as a period that is longer than 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, 40 minutes, etc.

As described herein, in some embodiments, the models 930, 932 may be a first neural network model and a second neural network model, respectively. In such cases, the server 920 may be a neural network, or a part of a neural network, and the images from the apparatuses 200*b*-200*d* may be utilized by the server 920 to configure the first model 930 and the second model 932. In particular, the processing unit 922 of the server 920 may configure the first model 930 and the second model 932 by training the models 930, 932 via machine learning. In some cases, the images from the different apparatuses 200*b*-200*d* form a rich data set from different cameras mounting at different positions with respect to the corresponding vehicles, which will be useful in training the first model 930. Also, output from the first model 930 may form a rich data set that will be useful in training the second model 932. In some embodiments, the first and second models 930, 932 may be separate neural network models that are separately maintained and processed. In other embodiments, the first and second models 930, 932 may be parts of a neural network model. In such cases, item 934 may be considered a neural network model having processing components 930, 932, wherein the single neural network model 934 is configured to receive images as input, and to provide an output indicating whether a driver is drowsy or not.

As used in this specification, the term "neural network" refers to any computing device, system, or module made up of a number of interconnected processing elements, which process information by their dynamic state response to input. In some embodiments, the neural network may have deep learning capability and/or artificial intelligence. In some embodiments, the neural network may be simply any computing element that can be trained using one or more data sets. By means of non-limiting examples, the neural network may be a perceptron, a feedforward neural network, a radial basis neural network, a deep-feed forward neural network, a recurrent neural network, a long/short term memory neural network, a gated recurrent unit, an auto encoder neural network, a variational auto encoder neural network, a denoising auto encoder neural network, a sparse auto encoder neural network, a Markov chain neural network, a Hopfield neural network, a Boltzmann machine, a restricted Boltzmann machine, a deep belief network, a convolutional network, a deconvolutional network, a deep convolutional inverse graphics network, a generative adversarial network, a liquid state machine, an extreme learning machine, an echo state network, a deep residual network, a Kohonen network, a support vector machine, a neural turing machine, a modular neural network, a sequence-to-sequence model, etc., or any combination of the foregoing.

In other embodiments, the first model 930 and/or the second model 932 may not be a neural network model, and may be any of other types of model. In such cases, the configuring of the first model 930 and/or the second model 932 by the processing unit 922 may not involve any machine learning, and/or images from the apparatuses 200*b*-200*d* may not be needed. Instead, the configuring of the first model 930 and/or the second model 932 by the processing unit 922 may be achieved by the processing unit 922 determining (e.g., obtaining, calculating, etc.) processing parameters (such as feature extraction parameters) for the first model 930 and/or the second model 932. In some embodiments, the first model 930 and/or the second model 932 may include program instructions, commands, scripts, parameters (e.g., feature extraction parameters), etc. In one implementation, the first model 930 and/or the second model 932 may be in a form of an application that can be received wirelessly by the apparatus 200.

After the first model 930 and the second model 932 been configured by the server 920, the models 930, 932 are then available for use by apparatuses 200 in different vehicles 910 to identify poses of drivers in camera images. As shown in the figure, the models 930, 932 may be transmitted from the server 920 to the apparatus 200*a* in the vehicle 910*a* via a network (e.g., a cloud, the Internet, etc.). The server 920 may transmit the first model 930 and the second model 932, directly or indirectly, to the apparatus 200*a* in the vehicle 910*a*. The apparatus 200*a* can then use the models 930, 932 to determine whether a driver is drowsy or not based on images captured by the camera of the apparatus 200*a*. In particular, the processing unit in the apparatus 200*a* may process images generated by the camera of the apparatus 200*a* to identify poses of drivers, and/or to determine whether drivers are drowsy or not, as described herein. The models 930, 932 may also be transmitted from the server 920 to the apparatuses 200b-200d in the respective vehicles 910b-910d.

In some embodiments, the transmission of the models 930, 932 from the server 920 to the apparatus 200 (e.g., the apparatus 200a) may be performed by the server 920 "pushing" the models 930, 932, so that the apparatus 200 is not required to request for the models 930, 932. In other embodiments, the transmission of the models 930, 932 from the server 920 may be performed by the server 920 in response to a signal generated and sent by the apparatus 200. For example, the apparatus 200 may generate and transmit a signal after the apparatus 200 is turned on, or after the vehicle with the apparatus 200 has been started. The signal may be received by the server 920, which then transmits the models 930, 932 for reception by the apparatus 200. As another example, the apparatus 200 may include a user interface, such as a button, which allows a user of the apparatus 200 to send a request for the models 930, 932. In such cases, when the button is pressed, the apparatus 200 then transmits a request for the models 930, 932 to the server 920. In response to the request, the server 920 then transmits the models 930, 932 to the apparatus 200.

In some embodiments, the models 930, 932 may be transmitted together for reception by the apparatus 200. In other embodiments, the models 930, 932 may be transmitted at different respective times. Also, in some embodiments in which the models 930, 932 are combined to form the combined model 934, the combined model 934 may be transmitted to the apparatus 200.

In the example shown in FIG. 8, there are three apparatuses 200b-200d in three respective vehicles 910b-910d for providing images of the respective drivers. In other examples, there may be more than three apparatuses 200 in more than three respective vehicles 910 for providing images to the server 920, or there may be fewer than three apparatuses 200 in fewer than three vehicles 910 for providing images to the server 920.

It should be noted that the server 920 of FIG. 8 is not limiting to being one server device, and may be more than one server devices. Also, the processing unit 922 of the server 920 may include one or more processors, one or more processing modules, etc.

In other embodiments, the images obtained by the server 920 may not be generated by the apparatuses 200b-200d. Instead, the images used by the server 920 to determine (e.g., to train, to configure, etc.) the first model 930 may be recorded using other device(s), such as mobile phone(s), camera(s) in other vehicles, etc. Also, in other embodiments, the images used by the server 920 to determine (e.g., to train, to configure, etc.) the first model 930 may be downloaded to the server 920 from a database, such as from a database associated with the server 920, or a database owned by a third party.

Specialized Processing System

Figure 9:
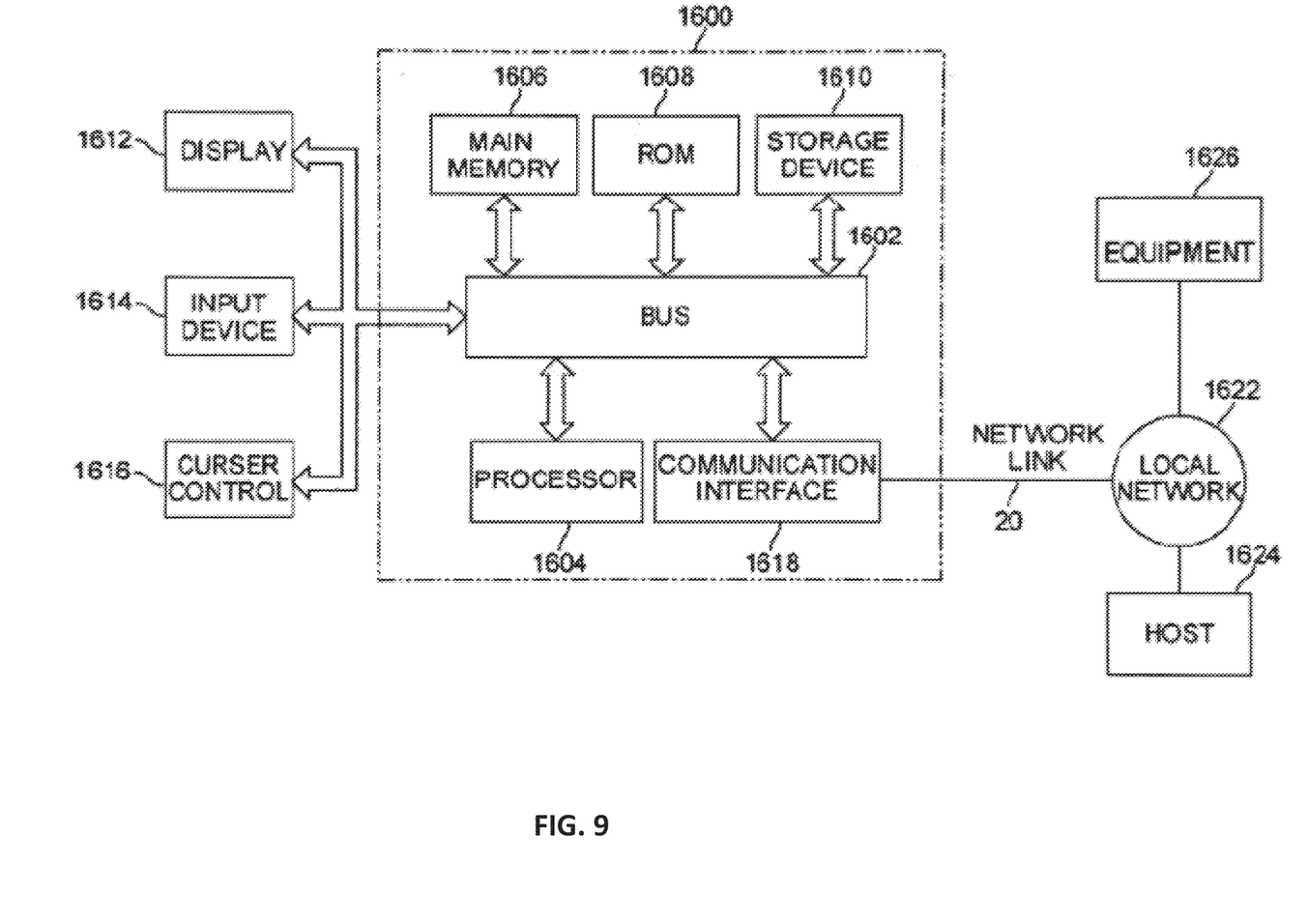
FIG. 9 illustrates a specialized processing system for implementing one or more electronic devices described herein.

FIG. 9 illustrates a specialized processing system for implementing one or more electronic devices described herein. For examples, the processing system 1600 may implement the apparatus 200, or at least a part of the apparatus 200, such as the processing unit 210 of the apparatus 200.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a screen or a flat panel, for displaying information to a user. An input device 1614, including alphanumeric and other keys, or a touchscreen, is coupled to the bus 1602 for communicating information and command selections to processor 1604. Another type of user input device is cursor control 1616, such as a touchpad, a touchscreen, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes cables, wire and fiber optics, including the wires that comprise the bus 1602. Transmission media can also take the form of acoustic or light waves, such as those generated during radio wave and infrared data communications.

Common forms of processor-readable media include, for example, hard disk, a magnetic medium, a CD-ROM, any other optical medium, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a storage of a remote computer or remote device. The remote computer or device can send the instructions over a network, such as the Internet. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card to provide a data communication. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

As used in this specification, the term "image" is not limited to an image that is displayed, and may refer to an image that is displayed or not displayed (e.g., an image in data or digital form that is stored).

In addition, as used in this specification, the term "model" may refer to one or more algorithms, one or more equations, one or more processing applications, one or more variables, one or more criteria, one or more parameters, or any combination of two or more of the foregoing. Also, the term "model" is not limited to only a single model, and may also refer to multiple models (e.g., sub-models) that are coupled together, such as in parallel or in series.

Furthermore, as used in this specification, the phrase "determine whether the driver is drowsy or not", or any of other similar phrases, do not necessarily require both (1) "driver is drowsy" and (2) "driver is not drowsy" to be possible determination outcomes. Rather, such phrase and similar phases are intended to cover (1) "driver is drowsy" as a possible determination outcome, or (2) "driver is not drowsy" as a possible determination outcome, or (3) both "driver is drowsy" and "driver is not drowsy" to be possible determination outcomes. Also, the above phrase and other similar phrases do not exclude other determination outcomes, such as an outcome indicating that a state of the driver is unknown. For example, the above phrase or other similar phrases cover an embodiment in which a processing unit is configured to determine that (1) the driver is drowsy, or (2) it is unknown whether the driver is drowsy, as two possible processing outcomes (because the first part of the phrase mentions the determination outcome (1)). As another example, the above phrase or other similar phrases cover an embodiment in which a processing unit is configured to determine that (1) the driver is not drowsy, or (2) it is unknown whether the driver is not drowsy, as two possible processing outcomes (because the later part of the phrase mentions the determination outcome (2)).

Also, as used in this specification, the term "signal" may refer to one or more signals. By means of non-limiting examples, a signal may include one or more data, one or more information, one or more signal values, one or more discrete values, etc.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. An apparatus comprising:
a camera configured to view a driver of a vehicle, and to generate images of the driver; and
a processing unit comprising a first model and a second model;
wherein the first model is configured to process the images of the driver and to output feature information based on the images, and wherein the second model is configured to receive the feature information from the first model, and to generate an output that indicates whether the driver is drowsy or not;
wherein the second model is configured to determine whether the driver is drowsy or not based on the feature information from the first model, and also based on information regarding a driving participation by the driver; and
wherein the second model is configured to obtain the information regarding the driving participation by the driver independent of the images of the driver, and is coupled downstream with respect to the first model that is configured to process the images of the driver.

2. The apparatus of claim 1, wherein the first model comprises a first neural network model configured to process the images.

3. The apparatus of claim 2, wherein the first neural network model is configured to identify one or more poses of the driver.

4. The apparatus of claim 2, wherein the second model comprises a second neural network model that is coupled in series with respect to the first neural network model.

5. The apparatus of claim 4, wherein the first neural network model is configured to identify poses of the driver over a duration, and output the feature information in a time series that indicates the identified poses of the driver over the duration; and
wherein the second neural network model is configured to process the time series to determine whether the driver is drowsy or not.

6. The apparatus of claim 4, wherein the second neural network model is configured to receive the feature information in a time series.

7. The apparatus of claim 1, wherein the feature information includes information regarding eye closure of the driver.

8. The apparatus of claim 1, wherein the second model is configured to determine whether the driver is drowsy or not based on a blink rate, a percentage-of-eyes-closed metric, a duration of eyes closed, time took to achieve eyelid closure, poses of the driver, or any combination of the foregoing.

9. The apparatus of claim 1, wherein the camera has a frame rate that is at least 10 frames per second.

10. The apparatus of claim 1, wherein the feature information cover features of the driver that occur over a duration that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, or 40 minutes.

11. The apparatus of claim 1, wherein the second model that is configured to receive the feature information from the first model, is also configured to obtain the information regarding the driving participation by the driver from a sensor.

12. The apparatus of claim 11, wherein the sensor is a part of the vehicle.

13. The apparatus of claim 11, wherein the sensor is a part of an on-board vehicle system.

14. A method performed by an apparatus having a camera and a processing unit, the processing unit having a first model and a second model, the method comprising:
generating, by the camera, images of a driver of a vehicle;
processing the images by the first model of the processing unit to obtain feature information;
providing, by the first model, the feature information;
obtaining, by the second model, the feature information from the first model; and
processing, by the second model, the feature information to obtain an output that indicates whether the driver is drowsy or not;
wherein the method further comprises obtaining information regarding a driving participation by the driver independent of the images of the driver, wherein the output that indicates whether the driver is drowsy or not is also based on the information regarding the driving participation by the driver; and wherein the second model is configured to obtain the information regarding the driving participation by the driver, and is coupled downstream with respect to the first model that is configured to process the images of the driver.

15. The method of claim 14, wherein the first model comprises a first neural network model.

16. The method of claim 15, wherein the images are processed by the first neural network model to identify one or more poses of the driver.

17. The method of claim 15, wherein the second model comprises a second neural network model that is coupled in series with respect to the first neural network model.

18. The method of claim 17, wherein the images are processed by the first neural network model to identify poses of the driver over a duration, and wherein the feature information is in a time series and indicates the identified poses of the driver over the duration; and
wherein the act of processing the feature information comprises processing the time series to determine whether the driver is drowsy or not.

19. The method of claim 17, wherein the feature information is in a time series.

20. The method of claim 14, wherein the feature information includes information regarding eye closure of the driver.

21. The method of claim 14, wherein the feature information is processed by the second model to determine whether the driver is drowsy or not based on a blink rate, a percentage-of-eyes-closed metric, a duration of eyes closed, time took to achieve eyelid closure, poses of the driver, or any combination of the foregoing.

22. The method of claim 14, wherein the camera has a frame rate that is at least 10 frames per second.

23. The method of claim 14, wherein the feature information cover features of the driver that occur over a duration that is at least: a fraction of a second, 1 second, 2 seconds, 5 seconds, 10 seconds, 12 seconds, 15 seconds, 20 seconds, 30 seconds, 1 minute, 2 minutes, 5 minutes, 10 minutes, 15 minutes, 20 minutes, 25 minutes, 30 minutes, or 40 minutes.

24. The method of claim 14, wherein the second model is configured to obtain the information regarding the driving participation by the driver from a sensor.

* * * * *